United States Patent
Tabata et al.

[11] 3,923,607
[45] Dec. 2, 1975

[54] PROCESS FOR PRETREATING SEA WATER BY PREHEATING SAME IN THE PREPARATION OF BRINE AND FRESH WATER

[76] Inventors: Hisanobu Tabata; Norimasa Tabata, both of No. 968, Nou, Ohkoshi, Sakaide, Kagawa, Japan

[22] Filed: July 9, 1973

[21] Appl. No.: 377,292

[30] Foreign Application Priority Data
Aug. 10, 1972 Japan............................... 47-80165

[52] U.S. Cl. ...................... 203/7; 202/173; 203/11
[51] Int. Cl.².. B01D 3/02; B01D 3/34; C23F 11/00; B01D 3/00
[58] Field of Search ................... 203/7, 11; 202/173; 159/13, 2 MS, 8

[56] References Cited
UNITED STATES PATENTS

| | | | |
|---|---|---|---|
| 2,979,442 | 4/1961 | Badger | 203/7 |
| 3,401,094 | 9/1968 | Lindsay, Jr. | 203/7 |
| 3,447,891 | 6/1969 | Crawford | 203/7 X |
| 3,467,587 | 9/1969 | Connell et al. | 202/173 |
| 3,476,654 | 11/1969 | Sieder | 203/7 |
| 3,476,655 | 11/1969 | Sieder | 203/7 X |
| 3,676,067 | 7/1972 | Tabata et al. | 203/7 X |

*Primary Examiner*—Jack Sofer
*Attorney, Agent, or Firm*—Toren, McGeady and Stanger

[57] ABSTRACT

A process for pre-treating sea water in the preparation of brine and fresh water from the sea water by heating in a multiple effect, multi-stage flash evaporator comprising taking the sea water to be treated out of the end of a heat recovery tube, which is at a temperature of 40° to 55°C, in the flash evaporating apparatus, elevating the temperature of the sea water up to approximately 50° to 65°C by heat exchanging it with the drain from the heat-exchanger for heating in the flash evaporating apparatus, removing calcium from the sea water in a calcium separating tank at a calcium removal rate of 80 to 99%, adjusting the pH of the sea water to pH 5.0 to 5.5 and deaerating it. The deaerated sea water is returned to the latter part of the first effect tank in the evaporating apparatus so that the temperature of the said pre-treated sea water becomes as close as possible to that of the sea water which is initially taken out of the heat-exchanger in the flash evaporating apparatus to minimize the possible energy loss of the flash evaporating apparatus.

1 Claim, 3 Drawing Figures

PROCESS FOR PRETREATING SEA WATER BY PREHEATING SAME IN THE PREPARATION OF BRINE AND FRESH WATER

The present invention relates to a process and an apparatus for pre-treating sea water by heating to produce brine and fresh water therefrom by heating the same water while avoiding scale and problems with corrosion of the iron and steel of the apparatus.

The most serious problems in producing fresh water from sea water by evaporation are those of preventing scale formation and providing materials resistant to corrosion of sea water.

In this invention, a process has been developed for producing brine and fresh water comprising reacting bittern produced as a by-product in the course of preparing kitchen salt from sea water with quick lime to produce magnesium hydroxide in the form of a slurry of 2 to 3% in sea water or fresh water, preparing a magnesium carbonate slurry by absorbing a combustion gas exhaust in the magnesium hydroxide slurry, in which the molar ratio of $CO_2/MgO$ is 0.3 to 1.2, adding the magnesium carbonate slurry to sea water so that the ratio of Ca in the sea water to $CO_2$ is between 1 : 1 and 1 : 2 (preferably 1 : 1 and 1 : 1.2), heating the mixture at 50° to 65°C to convert the dissolved calcium into calcium carbonate and separating the precipitate of calcium carbonate formed (amounting to 90 to 99% of the total calcium) followed by purification of the water by evaporation.

More particularly, the present invention relates to a process for heating the sea water with beneficial effects to a temperature of 50° to 65°C which is required for the pre-treatment of the sea water. In this invention, the sea water to be treated is taken out of the heat-recovery part of the flash evaporating apparatus used in the preparation of kitchen salt, and further treated by elevating the temperature of the sea water approximately to 50° to 65°C by exchanging heat with the condensate from the heat exchanger of the flash evaporating apparatus, removing calcium from the sea water up to 90 to 99% of the calcium removal rate in the calcium removing tank, adjusting the pH to 5.0 to 5.5 followed by deaeration and returning the final product to the flash evaporating apparatus.

It is recommended that the temperature of the pre-treated sea water obtained from the deaeration apparatus be made as close as possible to that of the sea water from the heat recovery part of the flash evaporating apparatus to minimize the possible energy loss of the flash evaporating apparatus. For this purpose, the flow rate in pipes of the heat recovery part should be 1 to 3 m/sec., to avoid deposition of scales and the mechanical erosion of pipes.

Further, the pipes of the heat recovery part should be divided into two groups accordingly in proportion to the quantities of the circulating and the pre-treated sea water. The sea water should be taken out of the pipe end of the heat recovery part where the temperature is presumed to be at 40 to 55°C, the temperature of which being estimated from the unbalanced temperature difference as assumed to be proportionally distributed in accordance with the stage numbers between the highest temperature of the sea water entering the first stage of the flash evaporating evaporating apparatus after steam heating at the heat exchanger, and the lowest temperature of the brine at the outlet having a reduced pressure of 40 Torr.

Since the outlet temperature of the calcium removal tank is presumed to be 60° to 65°C, the heat effect of the processes that follow, i.e., precipitation, filtration, pH adjustment and deaeration, is adequtely controlled so that the pre-treated sea water leaves the deaeration apparatus at a temperature of 40° to 55°C, the same temperature as that at the outlet of the heat recovery part. Thus, by minimizing the temperature difference between the sea water from the last recovery part prior to the treatment and that after the treatment to be returned from the deaeration tower to the flashing apparatus, the flashing apparatus can be most effectively operated without appreciable loss in energy.

The sea water on leaving the heat recovery part is colder than the temperature 50° to 65°C required to remove calcium and, therefore, it should be heated to the necessary extent before being transferred to the calcium removal tank. For this purpose, heat exchange with the hot drain from the heat exchanger for heating in the flashing apparatus is appropriate. In the present invention (references are to FIG. 1), sea water removed in line 6 from the heat recovery part where the temperature is 40° to 55°C is heated to 45° to 60°C by heat exchanging with the hot condensate pumped from the well of the brine heater 11. For heating the supply water, any heater may be employed among those of the heat-exchanging type and the direct mixing type.

In this invention, the pipes at the heat recovery part of the flash evaporating apparatus where the temperature is 40° to 55°C, are divided into two groups in either of the following two manners. One is to partition a bundle of pipes into two groups as shown in FIG. 2 and the other is to divide the pipes into two bundles as seen in FIG. 3. Either type or a combination of the two will be suitable.

Since the circulating water usually amounts to 5 to 10 times as much as the sea water to be treated, balancing of energy can not be attained only with pre-treated sea water. The energy could be balanced by dividing pipes of the heat recovery part into two groups so that the numbers of pipes are proportional to the amounts of circulation and treatment.

Further, the circulating brine and the sea water should flow in separate pipes to avoid mixing because they are quite different in their properties.

Apparatus for removing clacium from sea water, which are necessary for the pre-treatment of sea water prior to the flash evaporation of this invention, include a reaction tank in which the sea water is reacted with magnesium carbonate at 50° to 65°C and other devices which are attached, if necessary, such as, a reactor for bittern and quick lime, a reactor for magnesium carbonate formation in wich a $CO_2$ containing gas is absorbed into a slurry of magnesium hydroxide, a device for removing the by-products in the reaction with magnesium carbonate, and a separator for dust organic matter.

Following the above operations, the pre-treated sea water at 40° to 55°C in which 90 to 99% dissolved calcium has been removed is then returned to the latter part (at approximately 70° to 80°C) of the first effect tank.

The present invention will be explained in more detail with reference to drawings.

Figure 1:
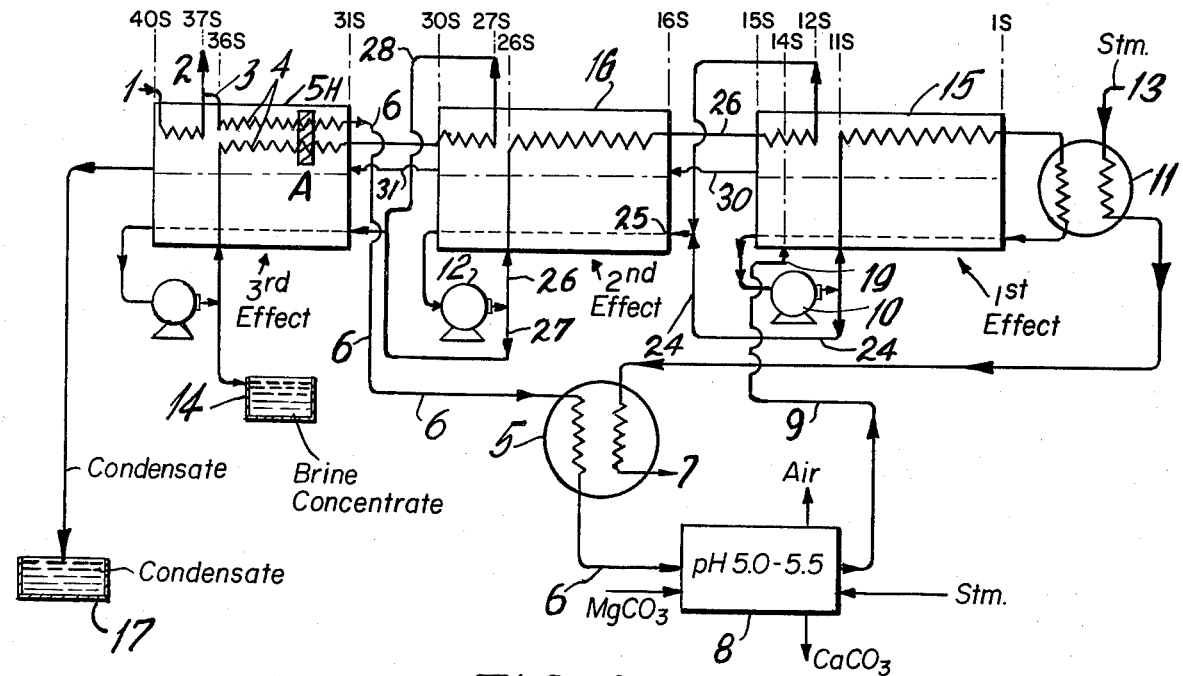
FIG. 1 illustrates the exemplified apparatus of the present invention.
Figure 2:
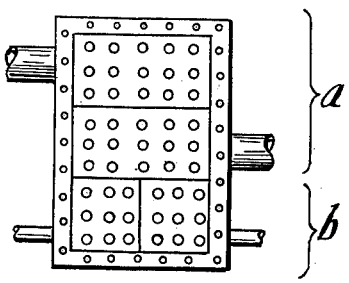
FIG. 2 shows the part A in FIG. 1 where pipes in the heat recovery portion of the third effect are divided into two groups, i.e., group *a* and group *b
Figure 3:
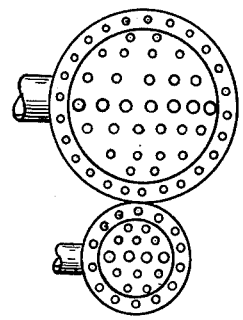
* and FIG. 3 shows another example of the same part as in FIG. 2.

FIG. 1 gives a sketch of a triple effect 40-stage flash for preparing fresh water from sea water. Sea water entered the last stage (the 40th stage) of the heat exhaust at 1 and the warmed sea water flowed out at the 37th stage, 2. The sea water was introduced at the rate of 200 ton/hour. A fraction, 40 ton/hour, of the sea water branched at the 37th stage and entered the 36th stage, 3. Tube bundle 4 in the heat recovery portion corresponding to the 36th to 31st stages of the third effect was divided into two groups as shown in FIG. 2, where the sea water to be pretreated flowed through two upper sections *a* while the concentrated brine flowed through the lower section *b* at the rate of 40 ton/hour. Thus, the sea water was preheated to 50°C on leaving the third effect 5H, and this water in line 6 was further heated in heater 5° to 55°C, before being transferred to the clacium removal tank 8, by exchanging heat with condensate 7 from the heat exchanger 11 acting as heat source for the flash evaporating apparatus. The condensate 7 was the condensed liquid from the steam 13 used for heating supplied by a boiler, not shown The calcium removal tank 8 is shown generally and should be understood to include the treatment of the sea water entering from line 6 with a magnesium carbonate slurry to produce calcium carbonate and remove it from the sea water by precipitation. It is best operated at a temperature of 50° to 65°C, preferably 60°C. To keep the tank at the said desired temperature, a small amount of steam might be added.

From the sea water which had been preheated at 60°C, 90 to 99% of calcium dissolved was removed as clacium carbonate by treating with a magnesium carbonate slurry in the calcium removal tank and was deaerated at pH 5.0 to 5.5 (also included generally in tank 8 and then transferred at the temperature about 50°C to the 14th stage at 19 of the first effect tank 15 through line 9.

The first effect tank 15 consisted of 15 stages where sea water was evaporated while being circulated with a circulated pump 10 to prepare fresh water. The brine, on leaving the 1st stage of the heat recovery part consisting of 11th to 1st stages, was heated to 110°C in the heater 11, introduced into stage 1 of flash evaporator, and flowed toward the 15th stage therein while being flash evaporated. A fraction 24 of the circulating brine leaving stage 15 the first effect 15, entered the lower flashing portion of the second effect tank 16 at point 25 flowing from the 16th to the 30th stage therein while still being flash evaporated. The brine was further transferred by a circulating pump 12 receiving brine from stage 30 of the second effect 16 and feeding it to the 26th stage therein, flowing in line 26 through a portion of the heat recovery part of the second effect 16, a portion of the 15th to 12th stages of the first effect 15 and was returned to the lower flashing part of the 16th stage in the second effect 16.

The other fraction of the brine leaving the second effect 16 was transferred to the third effect 5H through line 27 where it was flashed through stages 31 to 40 and then in part flowed through the heat recovery part of the 36th to the 31st stages before leaving the third effect 5H, and entered the vapor condensing portion, i.e., the 30th to the 27th stages, of the second effect 16 and finally returned again to the lower flash portion of the 31st stage of the third effect 5H via line 28.

The sufficiently concentrated brine thus prepared having the specific gravity of 18° Be was transferred to the brine storage tank 14 at the rate of 6 kl/hour. Fresh waters formed in the three effects, and transferred through lines 30 and 31 were collected in the fresh water tank 17 at the rate of 34m$^3$ per hour.

What is claimed is:

1. In a method for preparing brine and fresh water from sea water by heating the sea water in a multiple effect multi-stage flash evaporator, wherein the sea water first enters the final heat rejection stages of the flash evaporator and is passed in indirect heat exchange with vapor from the flashing sea water in said heat rejection stages to condense said vapor and preheat the sea water, the sea water being thereafter treated with magnesium carbonate to remove calcium therefrom and deaerated at a pH of 5.0 to 5.5, the sea water thereafter being introduced to the terminal flash stage of the first effect of the evaporator to be further flash evaporated, the improvement wherein the entering sea water is additionally preheated to about 50° to 65°C in a separate preheating stage prior to being subjected to the calcium removal and deaeration steps whereby after deaeration, the temperature of the thus treated sea water is about the same as it is in said terminal flash stage.

* * * * *